United States Patent [19]

Winter et al.

[11] Patent Number: 4,477,147

[45] Date of Patent: Oct. 16, 1984

[54] METHOD AND APPARATUS FOR ASSEMBLING AN OPTICAL FIBER COMMUNICATION CABLE

[75] Inventors: Joseph Winter, New Haven; Michael J. Pryor, Woodbridge, both of Conn.

[73] Assignee: Olin Corporation, New Haven, Conn.

[21] Appl. No.: 497,639

[22] Filed: May 24, 1983

Related U.S. Application Data

[63] Continuation-in-part of Ser. No. 395,443, Jul. 6, 1982, , and Ser. No. 413,846, Sep. 1, 1982, , which is a continuation-in-part of Ser. No. 324,242, Nov. 23, 1981, abandoned.

[51] Int. Cl.³ .............................................. G02B 5/16
[52] U.S. Cl. .................................. 350/96.23; 29/33 D; 29/400 C
[58] Field of Search .................... 350/96.23; 29/33 D, 29/400 C

[56] References Cited

U.S. PATENT DOCUMENTS 4,248,035  2/1981  Skillen et al. ................ 350/96.23 X
4,389,088  6/1983  Trezequet ........................ 350/96.23
4,396,446  8/1983  Franken ............................. 29/33 D

FOREIGN PATENT DOCUMENTS 2018454  10/1979  United Kingdom ............. 350/96.23

Primary Examiner—John D. Lee
Assistant Examiner—Akm E. Ullah
Attorney, Agent, or Firm—Barry L. Kelmachter; Paul Weinstein; Howard M. Cohn

[57] ABSTRACT

A method and apparatus are disclosed for fabricating an optical fiber communication cable having a metal containment tube and at least one optical fiber in static compression therein. The containment tube is preferably formed by applying a tensile load to a strip of metal and drawing the strip of metal through at least one forming die. Each fiber is inserted into the forming tube without the application of any significant tension. As a result, each fiber is in a substantially no-load condition at the same time that the strip is undergoing maximum plastic extension and said tube is undergoing elastic tension from the applied tensile load. Upon release of the tensile load, the tube will shrink and each fiber is placed into static compression.

24 Claims, 9 Drawing Figures

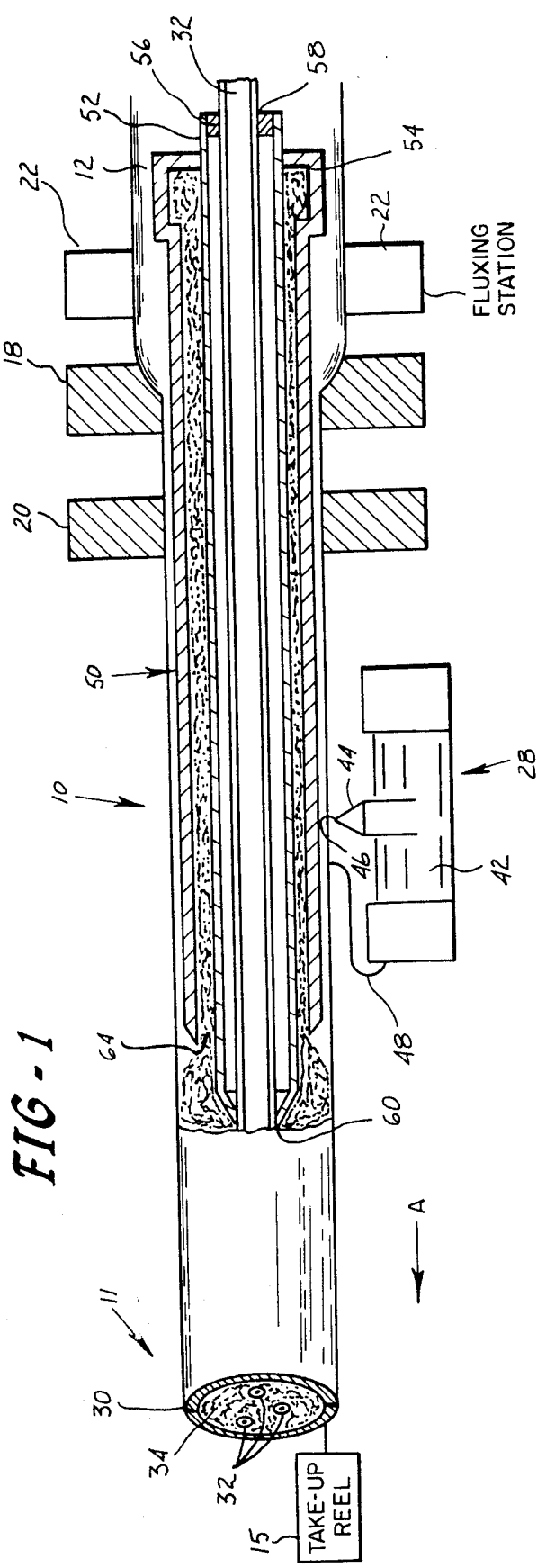
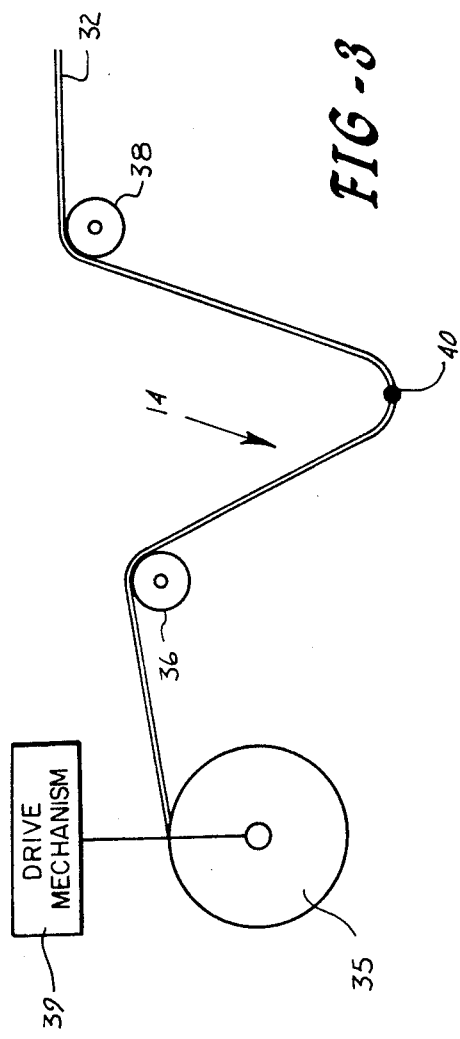

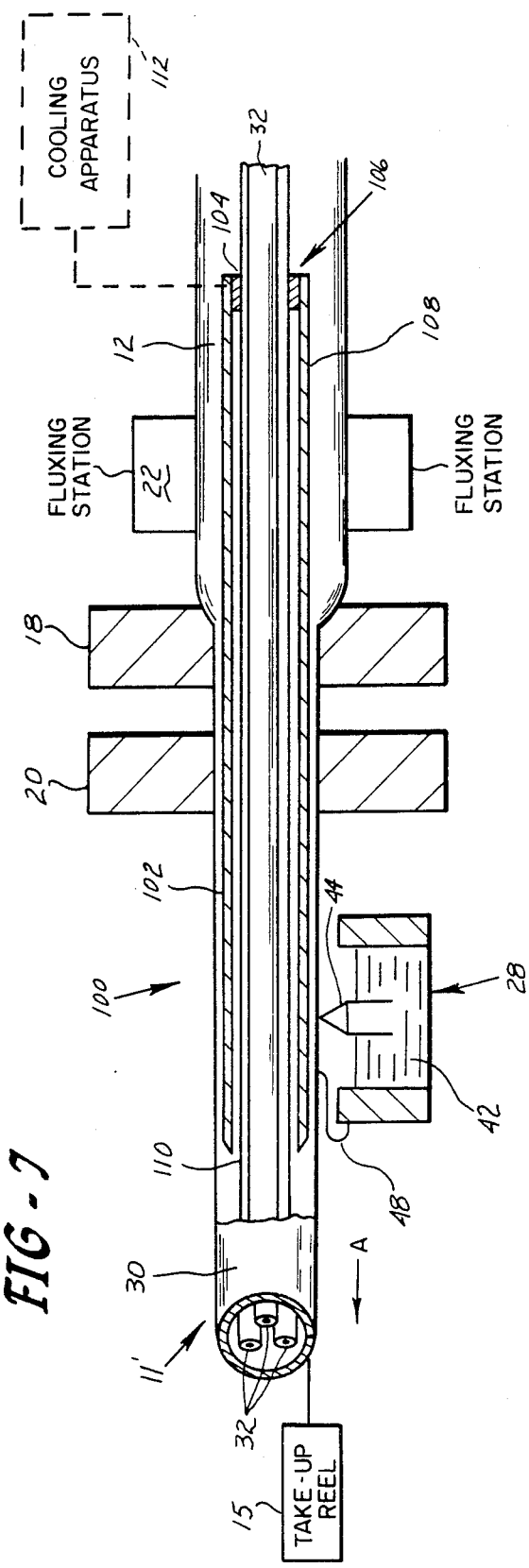
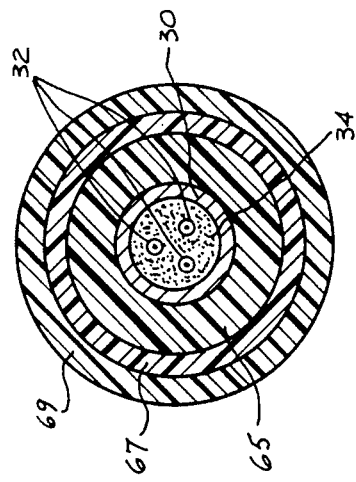

METHOD AND APPARATUS FOR ASSEMBLING AN OPTICAL FIBER COMMUNICATION CABLE

This application is a continuation-in-part of U.S. patent application Ser. No. 395,443 filed July 6, 1982 to Pryor et al. and of U.S. patent application Ser. No. 413,846 filed Sept. 1, 1982, which is in turn a continuation-in-part of U.S. patent application Ser. No. 324,242 filed Nov. 23, 1981, now abandoned, both to Winter et al.

This application is also related to U.S. patent application Ser. No. 497,546, filed May 24, 1983, which is a continuation-in-part of Ser. No. 272,154, filed June 10, 1981, now abandoned, Ser. No. 497,533, filed May 24, 1983, which is a continuation-in-part of Ser. No. 408,087, filed Aug. 13, 1982, now abandoned, and Ser. No. 497,522 filed May 24, 1983, which is a continuation-in-part of Ser. No. 461,736, filed Jan. 28, 1983, now abandoned, all to Winter et al.

The invention disclosed herein relates to a method and apparatus for assembling an optical fiber communication cable. The cable produced by the instant invention has utility in underground, undersea, and other communication applications.

The advent of optical fibers for use in communication applications has permitted construction of relatively small diameter cables. Generally, optical fiber communication cables are designed to provide all of the required electrical, optical, and physical functions within the smallest possible diameter. Additionally, the cables are constructed to have a relatively long uninterrupted length and good flexibility characteristics. Furthermore, in undersea applications, the cables are designed to withstand stresses induced by hydrostatic pressure, temperature, and sea action.

An optical fiber communication cable generally has a cable core consisting of a containment tube housing one or more optical fibers. When used in undersea environments, the containment tube often also houses an appropriate filler material such as a polyethylene or other long chain plastic gel material to position the fiber or fibers. One or more additional layers such as a strength layer, a dielectric layer, and/or an outer coating may surround the cable core. These additional layers generally are formed from appropriate plastic materials such as polyethylene, polyimides, polyamides, plastic filaments such as KEVLAR filaments embedded in an epoxy matrix, and other similar plastics.

A wide variety of optical fiber communication cable constructions as well as techniques for forming them are known in the art. U.S. Pat. Nos. 3,955,878 to Nowak, 4,118,594 to Arnaud, 4,146,302 to Jachimowicz, 4,201,607 to Rautenberg et al, 4,212,097 to Portinari et al., 4,239,336 to Parfree et al., 4,232,935 to Rohner et al., 4,248,035 to Skillen et al., 4,257,675 to Nakagome et al., 4,275,294 to Davidson, 4,278,835 to Jackson, 4,279,470 to Portinari et al. and 4,288,144 to Nakai et al., U.K. Pat. Nos. 1,461,151 and 1,487,464, German Offenlegungsschrift No. 2,507,649 to Tscharntke and the papers "Guidelines to the Design of Optical Cables" by Wilkins, presented at the Winter Annual Meeting, Dec. 2-7, 1979 of the American Society of Mechanical Engineers, "An Electro-Optical Array Support Cable" by Wilkins, presented at the Winter Annual Meeting, Nov. 16-20, 1980 of the American Society of Mechanical Engineers, "Recent Experience with Small, Undersea Optical Cables" by Wilkins, IEEE-EASCON, October, 1979, Washington, D.C., "How Small Can an Electro-Optical Transoceanic Cable Be?" by Wilkins, International Telemetry Society Conference, San Diego, Calif., Oct. 13-15, 1981 and "Design and Performance of an Undersea, Single-Fiber, Multi-Repeater, Full Duplex, Electro-Optical Data Link", by Wilkins et al., International Telemetry Conference, San Diego, Calif. Oct. 13-15, 1981 illustrate some of these constructions and techniques.

One technique for forming optical fiber cables passes a strip of metal or metal alloy through one or more folding dies to form a containment tube. Tubes formed using folding dies generally have a seam characterized by substantially linear edges and a notch or groove along the seam's outer periphery. During or just after tube formation, one or more fibers are inserted into the tube. U.S. Pat. No. 4,372,792 to Dey et al. and U.K. Pat. No. 1,583,520 to Chapman illustrate this technique.

The optical fibers used in communication cables are, of necessity, of high purity and defect-free in order to allow extended distance between repeaters used to amplify the signals. Stress or "Z" kinking rapidly degrade the fibers' ability to transmit by increasing attenuation. Obviously, fracture of a fiber terminates its signal and cannot be tolerated. Therefore, the use of a containment tube core structure to encapsulate the fiber or fibers and to protect them from kinking or external abrasion is highly desirable.

Frequently the containment tube is formed from a metal or metal alloy. A negative aspect of such metallic encapsulation, however, is that engineering metals, including low modulus high strength alloys, achieve an elastic extension of no higher than about 0.93% and normally are in the range of about 0.6% to 0.83%. Although an optical fiber can generally withstand elastic extension of well over 1%, the metallic core structure or containment tube cannot without engendering plastic flow. If such plastic flow is engendered, the core structure may eventually shrink to a length shorter than the fiber length resulting in a kink in the fiber.

A negative aspect to the use of glass optical fibers is their relatively low tensile strength value. The extent to which a glass optical fiber can be stretched under tension without breaking is relatively small. It follows that it is necessary to limit the stresses and deformations to which each fiber is subjected during both cable fabrication and cable use.

In an attempt to limit the stresses and deformations applied to the fiber or fibers during fabrication and use, prior art cable constructions have used fibers having a length greater than the length of the tubular core structure. This extra length of fiber permits the cable and core structure to be stretched before any tension or stress is transmitted to the fiber. The Nowak, Jachimowicz, Portinari et al. and Rohner et al. patents and U.K. Pat. Nos. 1,461,151 and 1,487,464 illustrate such cable constructions.

There are, however, several problems with the fabrication and the use of cables containing extra-long fiber lengths. For example, if too long a length of fiber is inserted into the core structure, the fiber may kink if the core structure shrinks after an applied load is released. If the fiber or fibers are inserted by applying a significant tensile force to an end of each fiber, one or more of the fibers could break if the fiber tensile strength is exceeded. If the fiber or fibers are driven or pushed into the core structure, there is a risk of hitting an abutment in or a wall of the containment tube and creating a kink.

In accordance with the instant invention, an improved process and apparatus for assembling an optical fiber communication cable is provided. In particular, the process and apparatus of the instant invention place the fiber or fibers in static compression during cable fabrication. As a result, a tensile force or stresses equal to the static compression in the fiber or fibers may be imposed on the cable without damaging the fiber or fibers. The process and apparatus of the instant invention also minimize the risk of damaging the fiber or fibers during cable fabrication.

The method of assembly according to the instant invention comprises forming a metal containment tube using a die forming technique. The containment tube is formed by applying a tensile load to a metal or metal alloy strip and drawing the strip through at least one forming die. During the tube forming, tube sealing and fiber insertion operations, substantially no tension or a negligible tension is applied to the optical fiber or fibers. As a result, the optical fiber or fibers will be placed into static compression when the tensile load being applied to the tube is released.

During the tube forming operation and subsequent sealing of the tube, the optical fiber or fibers and any filler material are housed within a protective sheath. The protective sheath isolates the fiber or fibers from the forces acting on the strip and the tube in the forming die or dies. The protective sheath also substantially prevents the transmission of any heat from the sealing operation to the fiber or fibers and to any filler material. If a filler material is used, the sheath prevents the filler material from adversely affecting the seam sealing operation.

Each fiber is inserted into the protective sheath without any significant back tension. This preferably is done by forming a catenary in each fiber. In a first embodiment, the catenary is formed by paying off a length of fiber and forming a loop of fiber between a pair of guide rolls. If desired, a small back tension may be applied to each fiber by suspending a weight, e.g. a dancer, from each fiber. Each fiber payoff reel should be provided with a controlled mechanical drive for insuring that the catenary is always the same. In an alternative embodiment, the catenary is formed using an accumulator. The presence of the catenary in each fiber provides sufficient slack to allow time to unravel any fiber tangles on the supply reel.

It has been found that in those embodiments where a filler material is used, movement of the formed tube creates a suction type force. This suction type force is believed to be created by movement of the tube without access to air to fill the void in the hollow tube. This suction force coupled with the filler material flowing into the tube, preferably under an applied external pressure, draws the fiber or fibers into the tube without the application of any significant forward tensile force. In those embodiments where no filler material is used, an end of the fiber is connected to an end of the strip forming the tube. The frictional contact between any buffer material surrounding each fiber and the moving tube will assist in drawing the fiber or fibers into the tube. The fiber or fibers should be inserted with only a negligible tensile force being applied to each fiber.

It is preferred that the strip forming the tube have a cross-sectional area greater than the cross-sectional area of the tube to be formed. The cross-sectional area of the strip should be from about 5% to about 20%, preferably from 8% to 17% and most preferably from about 10% to about 15%, greater than the cross-sectional area of the tube to be formed. Inherently with the tube forming techniques used herein, the extra volume of material provided by the excess cross-sectional area will primarily show up as longitudinal tube extension. In addition, the extra material will be redistributed in the forming die or dies so that a relatively tight seam without a notch or well at the outer periphery of the seam will be formed. Further, the edges of the tube are inherently deformed by the tube-forming techniques described herein to provide substantially non-linear and intermeshing edges. The increased surface area provided by the deformed edges provides increased surface area to which the sealing material can adhere thereby improving the resultant strength of the seal. The extra volume of material also causes the strip to undergo maximum plastic extension in the forming die.

After the tube leaves the forming die or dies, the applied tensile force places the tube in elastic tension. Each fiber is under substantially no tension or a negligible tension at the same time that the strip undergoes maximum plastic extension and the tube undergoes elastic tension. Upon release of the tensile load applied to the tube, the tube will shrink and the fiber or fibers will be placed in static compression. The static compression has a magnitude substantially equal to the magnitude of the elastic tension on the tube. It has been found that using the technique of the instant invention, each fiber in the final cable construction should have a length greater than the length of the tube. The extra length of the fiber will be less than about 1% of the tube length.

As well as forming a cable construction that can undergo a certain amount of tension before that tension is transmitted to the fiber or fibers, the technique of the instant invention provides a cable construction that can better deal with thermal stresses, particularly during the fabrication process. The thermal coefficient of expansion of an optical fiber is generally less than the thermal coefficient of expansion of any metal or metal alloy forming the containment tube. If during fabrication heat is created, e.g. such as by forming stresses causing adiabatic heating or by the tube sealing operation being performed at elevated temperatures, the metal or metal alloy will expand more than the fiber or fibers. When the assembly is eventually brought back to room temperature, microbends or kinks in the fiber or fibers could be created as a result of the metal or metal alloy returning to its normal size. The risk of such an occurrence is substantially minimized by the technique of the instant invention.

If desired, the containment tube may be used as an electrical conductor for transmitting power. It may be formed from a single layer or a composite of metal or metal alloy. If formed from a composite, one of the composite layers may be skived to form a plurality of electrical conductors.

After the cable core has been fabricated, it may be surrounded by one or more additional layers. The additional layer or layers may comprise a dielectric layer, a loadbearing layer, and/or an outer covering.

The apparatus for assembling an optical fiber communication cable in accordance with the instant invention preferably includes a capillary means or protective sheath for protecting the fiber or fibers during the tube forming and sealing operations. In a first embodiment, the protective sheath comprises concentric chambers or passageways for inserting both a filler material and at least one optical fiber. Preferably, one of the concentric chambers or passageways extends into the containment tube farther than the other. In a first embodiment, the protective sheath deposits each fiber into the containment tube downstream of the location where the filler material is injected into the sealed tube. In a second embodiment, the protective sheath comprises a single passageway or chamber for substantially simultaneously inserting into the tube the filler material and the optical fiber or fibers. In a third embodiment, the protective sheath comprises a single passageway or chamber for inserting at least one optical fiber into the sealed tube without any filler material.

To substantially prevent the transmission of heat to the fiber or fibers and to any filler material during the seam sealing operation, the protective sheath is preferably formed from a material having a relatively low thermal conductivity. As well as having a low thermal conductivity, the sheath material should not be a material that will be bonded to the containment tube by the seam sealing operation and should be able to withstand the temperatures associated with the seam sealing operation. Suitable materials for the protective sheath include high stainless steels, refractory alloys, ceramics and insulating materials. Alternatively, the protective sheath may be formed from a composite material. The composite may comprise an outer material having a low thermal conductivity and an inner material having a higher thermal conductivity. If desired, the protective sheath may be joined to an external cooling system for withdrawing any heat within the sheath.

The cables produced by the method and apparatus of the instant invention generally have a relatively small diameter and good flexibility characteristics. They also are capable of resisting sea action and of withstanding the pressures and temperatures associated with undersea applications. In addition, the cables produced by the method and apparatus of the instant invention are capable of being level wound on a storage reel, of being stored on a reel with a minimum total volume and of having relatively long uninterrupted lengths.

It is an object of the present invention to provide a method and apparatus for assembling an optical fiber communication cable that minimizes the risk of kinking, breaking, or otherwise damaging the optical fiber or fibers during fabrication.

It is a further object of the present invention to provide a method and apparatus for assembling an optical fiber communication cable as above that places the optical fiber or fibers into static compression during fabrication.

It is a further object of the present invention to provide a method and apparatus for assembling an optical fiber communication cable as above that can undergo a certain amount of tension and/or stress during use without kinking, breaking or otherwise damaging the optical fiber or fibers.

These and other objects will become more apparent from the following description and drawings.

Embodiments of the method and apparatus for assembling the optical fiber communication cable and the cable produced by the instant invention are shown in the drawings wherein like numerals depict like parts.

FIG. 1 is a schematic representation in partial cross section of a side view of an apparatus used to assemble a first type of optical fiber communication cable core having one or more optical fibers and a filler material.

FIG. 3 is a schematic representation of an apparatus for feeding the optical fiber or fibers into the apparatus of FIG. 1.

FIG. 5 is a schematic representation in cross section of a first cable embodiment produced in accordance with the instant invention.

FIG. 7 is a schematic representation in partial cross section of an alternative embodiment of an apparatus for assembling an optical fiber communication cable core without any filler material.

FIG. 8 is a schematic representation in cross section of an optical fiber communication cable core formed by the apparatus of FIG. 7.

Figure 2:
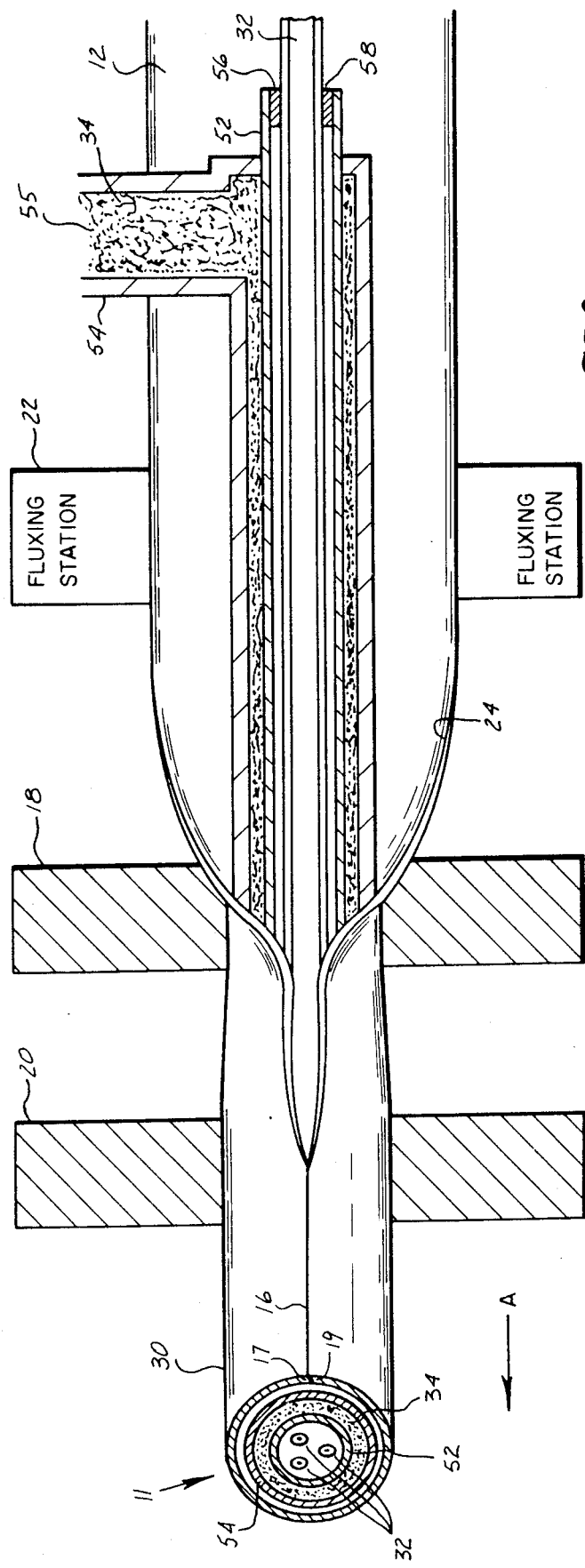
FIG. 2 is a schematic representation in partial cross section of a bottom view of a portion of the apparatus of FIG. 1.
Figure 4:
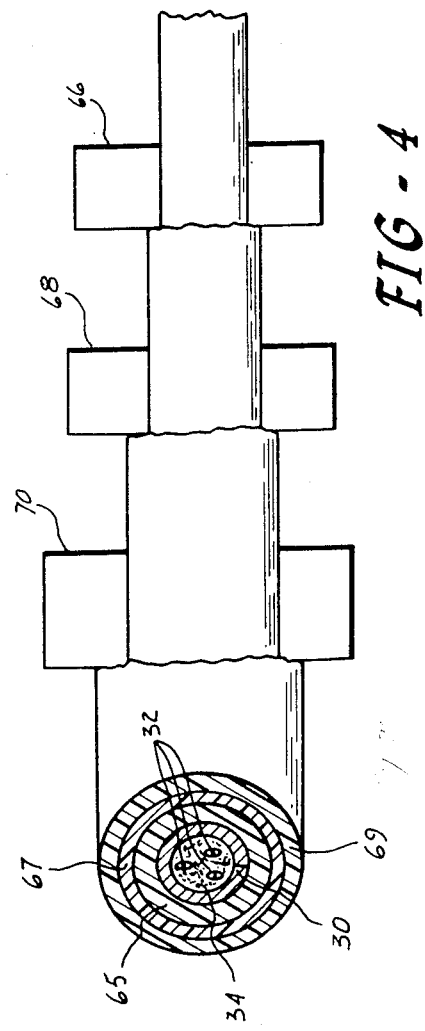
FIG. 4 is a schematic representation in partial cross section of an apparatus used to fabricate the outer layers of the optical fiber communication cable.

In accordance with this invention, a process and apparatus for assembling an optical fiber communication cable having one or more optical fibers in static compression are provided. The instant invention readily solves the problem of forming, filling, and sealing a tubular structure with negligible risk to the fiber or fibers within the structure. In addition, the instant invention forms an optical fiber cable construction that can undergo some degree of tension and/or stress without kinking, breaking or otherwise damaging the optical fiber or fibers within the cable.

Referring now to the Figures, an apparatus 10 for assembling a cable core 11 that has particular utility in optical fiber cables for undersea applications is illustrated. A strip 12 of metal or metal alloy is formed into a tubular structure such as containment tube 30 by drawing the strip through a fluxing station 22, through a first die 18 for forming the strip into an open tube section and finally through a second die 20 for closing the open tube section.

It has been found to be quite advantageous to form the tube 30 from a metal strip 12 having a transverse cross-sectional area which exceeds the desired transverse tube cross-sectional area by about 5% to about 20%, preferably by about 8% to about 17%, and most preferably by about 10% to about 15%. Inherently with the tube-forming technique used herein the extra volume of metal provided by the excess cross-sectional area shows up essentially as longitudinal extension of the resulting tube 30. It has been found that using the tube-forming techniques described herein there is no significant change in wall thickness. The wall thickness of the resultant tube is substantially the same as the thickness of the starting strip 12. The tube-forming techniques described herein are, therefore, similar in some respects to "tube sinking". The total length of tube 30 produced by the tube-forming techniques described herein will be greater than the total length of the starting strip 12 due to the aforenoted longitudinal extension of the tube 30. The amount of the tube extension corresponds substantially to the aforenoted percentage differentials in strip cross-sectional area versus tube cross-sectional area.

This extra volume of metal also inherently assists in the formation of a tube having a relatively tight seam 16 without a notch or well at the outer periphery of the seam. Further, the edges 17 and 19 of the metal tube 30 forming the seam 16 are inherently deformed by the tube-forming techniques described herein to provide substantially non-linear and intermeshing edges 17 and 19. This results in an increased surface area of the edges to which the sealing material can adhere as compared to the original strip 12 edges thereby improving the resultant strength of the seal. This also results in better hermeticity than prior cable core assemblies.

The deformed intermeshing edges 17 and 19 are the inherent result of the tube forming technique used herein and do not correspond to the shape of the original strip edges. The deformed edges 17 and 19 result from the drawing or sinking of the tube by the tube-forming technique used herein.

In contrast, a tube formed by folding even with the use of a die forming technique would not have such deformed edges since in a folding operation the starting strip would not include the excess material which the process of this invention converts into longitudinal extension by drawing or sinking. A deficiency of the folding technique is that a well or depression occurs at the outer surface along the seam. In accordance with this invention, the presence of excess material from the metal strip causes the outer surface to form against the die so as to eliminate such a well or depression along the seam. This is highly significant since it reduces the amount of solder or brazing material which would be required to provide a circular outer periphery to the resultant tube 30.

The manner in which the dies 18 and 20 form the strip 12 into the containment tube 30 is more fully described in co-pending U.S. patent application Ser. No. 461,736 to Winter et al. filed Jan. 28, 1983, which is hereby incorporated by reference.

Strip 12 may comprise a single length of material or may be a plurality of lengths joined together. If the strip 12 comprises a plurality of joined lengths, the lengths may be joined in any suitable manner. For example, conventional joining techniques such as brazing, soldering, welding and diffusion bonding may be used to bond the strips together.

Strip 12 may be formed from any metal or metal alloy that exhibits a desired set of properties. The desired properties would depend upon the ultimate use of the formed tubular structure. In fabricating containment tubes for communication cables, properties such as strength, formability and electrical conductivity are important. The strip 12 should have sufficient hardness to enable it to be formed into a tube by being drawn through a plurality of dies. The strip 12 should be in a wrought and partially work hardened condition. Accordingly, the strip should be at least about ¼ hard and preferably at least about full hard.

If desired, strip 12 may be a composite material 25 having first and second layers 27 and 26 of metallic material separated by a layer 29 of a flexible dielectric material. A first one 27 of the metallic layers may comprise an electrically conductive material such as copper or a copper alloy having a conductivity in excess of 50% IACS. The second metallic layer 26 may comprise a high strength material, e.g. stainless steel. If desired, the first layer 27 may be segmented into a plurality of distinct longitudinally extending strips for forming a plurality of electrical conductors. The method of using a containment tube formed from such a composite material is more fully described in parent application Ser. No. 395,443 filed July 6, 1982 to Pryor et al., which is hereby incorporated by reference.

Prior to undergoing the tube forming operation of the instant invention, the strip 12 may be passed through a suitable cleaning system not shown for removal of contaminants. The cleaning system utilized will depend upon the metal or metal alloy forming the strip and the nature of the contaminants to be removed. Any suitable conventional cleaning system known in the art may be utilized.

Prior to being fed into the tube forming apparatus, the strip 12 preferably passes through a fluxing station 22. The fluxing station comprises any conventional means known in the art for applying any conventional flux preferably to the edges of the strip. Since the fluxing station is not absolutely necessary to form the tube 30, it may be omitted if desired.

The strip 12 is fed into the apparatus 10 and connected via any suitable means known in the art to take-up reel 15. A tensile force may be applied to the strip to draw it through the forming dies 18 and 20 by any suitable pulling means not shown known in the art.

Die 18 may comprise any suitable die arrangement known in the art for forming an open tube section having a minor diameter less than the diameter desired for the tube 30. Die 20 may comprise any suitable bending-expansion die known in the art for placing the edges 24 of the open tube section into edge to edge confrontation and creating residual compressive forces in the metal or metal alloy that hold the seam edges in close proximity.

While a particular two die tube forming technique has been described above, the containment tube 30 may also be formed by a one-die technique such as that shown in parent application Ser. No. 413,846 or by the two-die technique in U.S. patent application Ser. No. 408,087 filed Aug. 13, 1982 to Winter et al., which is hereby incorporated by reference.

After the containment tube 30 has been formed, it is passed to a station 28 for closing the seam 16. The substantially non-linear deformed edges forming the seam 16 promote effective sealing of the tube by providing an increased surface area to which a sealing material can adhere. Sealing station 28 may comprise any conventional sealing apparatus for soldering, welding, brazing, or applying any other suitable sealing technique.

In a preferred arrangement, station 28 comprises means for soldering the seam. A supply of solder may be fed in a conventional manner such as by a pump not shown to a soldering head 44 having an orifice 46. Preferably, the solder is fed through the soldering head 44 and orifice 46 at a pressure sufficient to create a spout of solder. As the tube 30 and the seam 16 pass over the spout of solder, the movement of the tube and surface tension drive the solder into the seam interface formed by the edges 24. The solder capillaries up into and substantially fills the seam 16. By sealing the tube in this fashion, the tube may be provided with a relatively high degree of hermeticity. Any suitable solder including silver solders, high-temperature solders, low-temperature solders such as lead-tin solder, lead-antimony solder, tin-antimony solder, etc., may be used to close the seam and the tube. Another technique which may be used to solder the seam is shown in co-pending U.S. patent application Serial No. 497,535 filed May 24, 1983 to Winter et al. which is hereby incorporated by reference.

After passing over the soldering head 44, tube 30 preferably passes over a wiping device 48 for removing any excess solder. Wiping device 48 may comprise a spring wipe or any other suitable wiping device.

During the tube forming and sealing operations, at least one optical fiber 32 is located within a protective sheath 50. The function of the protective sheath 50 will be more fully discussed hereinafter. For reasons previously explained, it is desired that substantially no tension or a negligible tension be applied to each fiber 32 during the tube forming operation. Therefore, each fiber 32 should not have any significant back tension applied to it. An apparatus 14 for avoiding the application of any significant back tension to each fiber is shown in FIG. 3.

The optical fibers 32 generally are provided on an individual storage or payoff reel 35. Frequently, frictional forces associated with rotation of the reel as the fiber is payed off apply a back tension force to the fiber. It has been discovered that this undesirable back tension force may be substantially avoided by forming a catenary in the fiber. By using a catenary, the only back tension applied to the optical fiber is the weight of the fiber in the catenary and that is minimal. The catenary also insures that there is sufficient slack in the fiber to allow time to unravel any fiber tangles on the supply reel.

In a preferred embodiment, the catenary loop is formed by first passing the optical fiber over a guide roll 36 and thereafter passing the optical fiber over a second guide roll 38. The surfaces of the rolls 36 and 38 should not apply any significant frictional force to the fiber 32. Preferably, the roll surfaces are slippery to any buffer material surrounding the optical fiber. Each payoff reel 35 may be provided with a controlled drive mechanism 39. The drive mechanism 39 provides a continuous payoff of optical fiber 32 and insures that the catenary is always substantially the same.

There are occasions where stresses in and on the optical fiber and/or the buffer material surrounding the fiber have to be overcome by exerting positive control on the fiber. This may be done by applying a relatively small back tension to the fiber 32 with a dancer 40. The dancer 40 preferably comprises a small weight controlled by gravity, although any suitable dancer arrangement known in the art may be used. Dancer 40 may be suspended from the catenary in any suitable fashion known in the art.

As well as using the above-described approach, the catenary may be formed using an accumulator not shown. The accumulator preferably has a moving group of rolls about which the fiber is wound. The rolls may move toward or away from each other. By moving the rolls relative to each other, a small back tension if needed may be applied to the fiber. The accumulator also provides sufficient slack to handle microkinks in the fiber or tangles in the fiber on the payoff reel.

Where multiple optical fibers are to be fed into protective sheath 50, each optical fiber 32 preferably has a catenary loop formed in it.

Since the tube forming operation preferably takes place about the fiber or fibers 32, a protective sheath 50 is provided for preventing damage to the fiber or fibers 32 and to any filler material 34 from the tube forming and sealing operations. The sheath 50 also isolates the fiber or fibers 32 from the stresses undergone by the strip in the dies 18 and 20 and prevents any filler material from seeping into the seam 16 and adversely affecting the sealing operation. In those instances where one is required, sheath 50 may also function as a mandrel.

After the sealing operation has been completed and the solder has solidified, the fiber or fibers 32 and a filler material 34, if one is needed, are inserted into the tube 30. As used herein, the term inserted means released from the sheath and deposited into the sealed tube. If used, the filler material 34 preferably is inserted into the tube 30 just upstream of the insertion of the at least one optical fiber 32 into the tube.

In situations where both at least one optical fiber and a filler material are to be inserted into the tube 30, the protective sheath 50 may comprise a first chamber or passageway 52 through which the optical fiber or fibers 32 pass and a concentric second chamber or passageway 54 for inserting the filler material 34. Passageway 52 has a pressure seal 56 with an inlet opening 58 at a first end. The optical fiber or fibers 32 enter the passageway 52 through the opening 58. At the opposite end of passageway 52 is an outlet opening 60. Passageway 52 and outlet 60 guide the optical fiber or fibers 32 and deposit or release the fiber or fibers 32 into the tube 30. One advantage to releasing the fiber or fibers 32 into the tube after the sealing operation has been completed is that the risk of damage to the fiber or fibers as a result of the sealing operation is minimized.

The passageway 54 for inserting filler material 34 into the tube preferably concentrically surrounds the passageway 52. The filler material 34 enters the passageway 54 through an inlet opening 55 preferably while under pressure. The passageway 54 has an outlet opening or exit nozzle 64 through which the filler material 34 flows into the tube. Passageway 54 extends a distance sufficient to insure that the filler material 34 does not flow into the tube member until after the solder has solidified. By waiting until after the solder has solidified to inject the filler material 34 into the tube 30, any risk of the filler material adversely affecting the sealing operation or vice-versa is minimized and an improved seal may be effected.

Although the filler material 34 may be introduced into passageway 54 in substantially any form and at substantially any desired temperature, it has been found to be desirable to insert the filler material 34 into the passageway 54 in a heated condition. This heated condition improves the flowability of the filler material 34 by making the filler material more fluid. Any suitable conventional heating device not shown may be used to heat the filler material 34 either before or after it enters the passageway 54. Any suitable filler material known in the art, preferably petroleum jelly or a similar gel-like substance, may be used for filler material 34.

The filler material 34 is preferably introduced into passageway 54 under pressure. Any suitable conventional mechanism not shown can be used to supply the filler material 34 under pressure to passageway 54. Filler material 34 helps position the fiber or fibers 32 within the tube.

Movement of the tube 30 creates a suction force at the outlet 64. This suction force aided by the pressure being applied to the filler material draws or pulls the optical fiber or fibers 32 into the tube 30. By drawing the fiber or fibers 32 into the tube 30 in this fashion, substantially no tension or a negligible forward tensile force will be applied to the fiber or fibers 32. As a result, the fiber or fibers 32 are in a substantially no-load condition at the same time that the strip 12 is undergoing maximum plastic extension in the forming die or dies. After leaving the die 20, the tube 30 will be under elastic tension while each fiber 32 is still in a substantially no-load condition. After unloading of the tube 30, each fiber 32 will be placed in static compression. The magnitude of the static compression in each fiber will be substantially equal to the magnitude of the elastic tension applied to the tube. After the fiber or fibers 32 are placed into static compression, a tensile force or stresses substantially equal to the static compression may be imposed on the tube 30 without kinking, breaking, or otherwise damaging the fiber or fibers 32.

During the insertion process, each fiber 32 preferably has a speed substantially equal to the speed of the tube 30 leaving the die 20. As discussed hereinbefore, strip 12 preferably has an initial cross-sectional area greater than the cross-sectional area of the tube to be formed and the tube forming process used herein forms a tube having an extension substantially equal to the excess strip area. As a result, the speed of each fiber will be less than the speed of the strip 12 entering the die 18 by approximately the amount of the extension.

If necessary, tube 30 may be passed through a die not shown for sizing the tube 30 to an exact desired dimension. The sizing die preferably comprises a sinking die. If a sizing die is utilized, the optical fiber or fibers 32 are preferably inserted into the tube 30 just prior to or simultaneous with the tube 30 passing through the sizing die.

Figure 6:
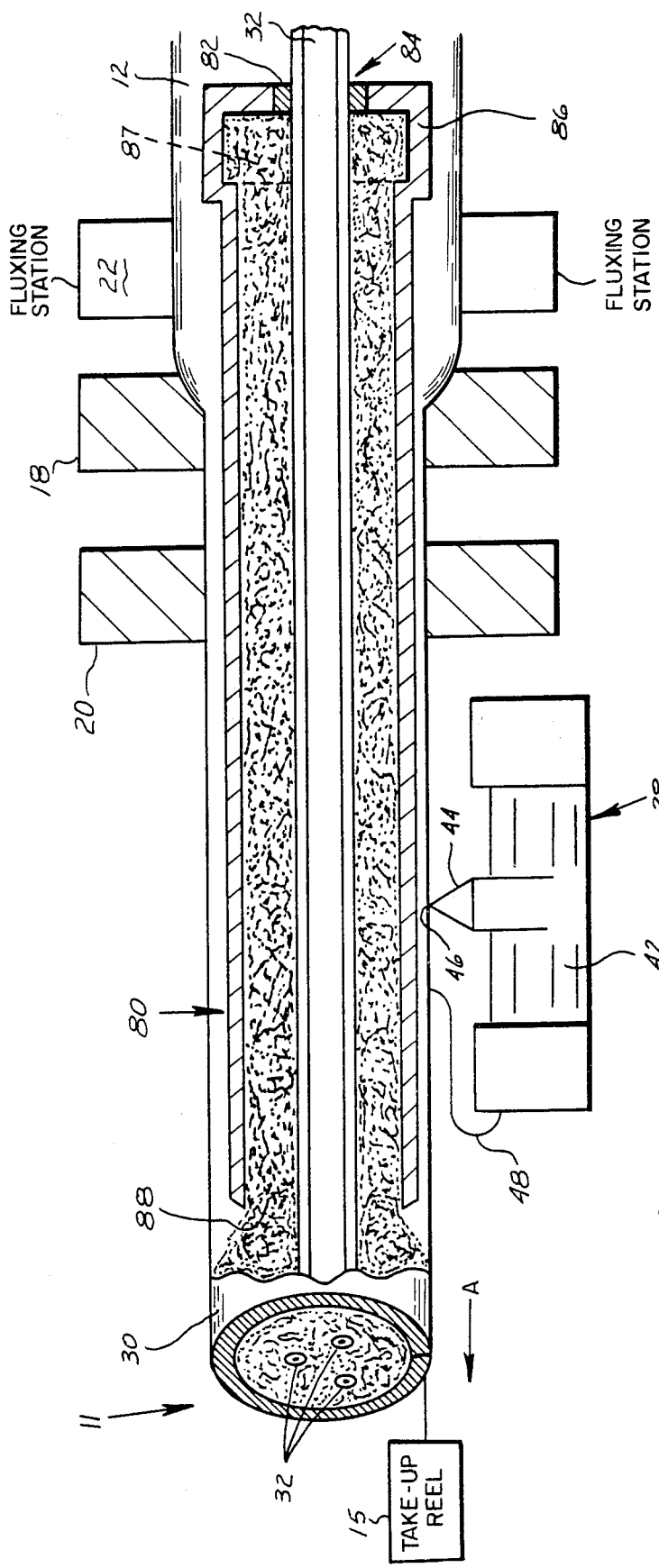
FIG. 6 is a schematic representation in partial cross section of a side view of a second embodiment of an apparatus used to assemble an optical fiber communication cable core having one or more optical fibers and a filler material.
Figure 9:
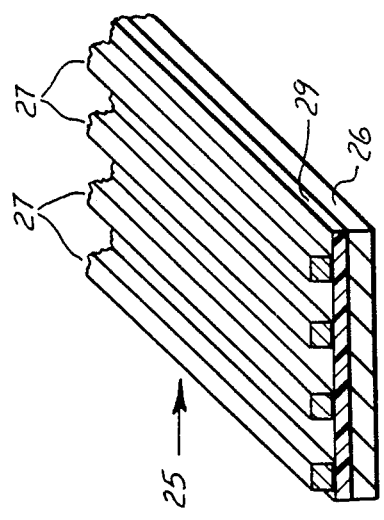
FIG. 9 is a schematic representation of a composite material from which the containment tube may be formed.

In FIG. 6, a preferred embodiment of the protective sheath is illustrated. After the tube 30 has been formed and sealed in the manner previously described, the fiber or fibers 32 and the filler material 34 may be inserted substantially simultaneously by the protective sheath 80. The protective sheath 80 preferably comprises a single passageway 86 having a pressure seal 82 with an inlet opening 84 at a first end. The optical fiber or fibers 32 from a catenary such as that of FIG. 3 enter the passageway 86 through the opening 84. On a sidewall of the passageway 86, preferably adjacent the seal 82, an inlet opening 87 is provided for supplying filler material 30 into the passageway 86. In a preferred arrangement, the pressure seal 82 and the inlet opening 87 are at a substantially right angle to each other. At the end of the passageway 86 opposed from pressure seal 82, an outlet opening 88 is provided. The passageway 86 extends a sufficient distance into the tube 30 that the fiber or fibers 32 and the filler material 30 are released into the tube 30 after the solder has solidified and the tube 30 has been completely sealed.

As before, the filler material 34 is preferably inserted into the passageway 86 while under pressure. Movement of the tube 30 and the filler material 34 will again draw the fiber or fibers 32 into the tube 30 without applying any substantial tension to each fiber 32. Upon release of the tensile load applied to the tube, the fiber or fibers will then be placed in static compression.

Since the filler material 34 is used to fill the tube 30, it should flow at a speed faster than that of the tube and the fiber or fibers. To improve its flowability, the filler material is preferably inserted into passageway 86 in a heated condition. The temperature of the filler material should not be so high that the fiber or fibers are damaged.

If a sizing die not shown need be used, outlet opening 88 is preferably located substantially near the location of the sizing die. Again, the sizing die preferably comprises a sinking die.

For certain applications, it is not necessary to have a filler material surround the optical fiber or fibers within the cable core. FIG. 7 shows an alternative apparatus 100 for forming such a cable core 11'. The apparatus 100 is readily adaptable for inserting one or more optical fibers 32 in a substantially unloaded condition into a closely surrounding containment tube.

After the tube 30 has been formed and sealed in the manner previously described, the fiber or fibers 32 may be inserted or released into the containment tube by protective sheath 102. The protective sheath 102 preferably comprises a single passageway 108 having a seal 104 with an inlet opening 106 at a first end. The optical fiber or fibers 32 from a catenary arrangement such as that of FIG. 3 enter the passageway 108 through the opening 106. At the end of the passageway 108 opposed to the seal 104 is outlet opening 110. The passageway 108 extends a sufficient distance into the tube that as the fiber or fibers 32 emerge from the opening 110, the fiber or fibers are released into the tube 30 after the solder has solidified and the tube 30 has been completely sealed. The protective sheath 102 minimizes the possibility of the sealing operation damaging the optical fiber or fibers.

To insert the fiber or fibers 32 into the tube 30, one end of each fiber is connected to an end of the tube 30. The tensile force applied to the tube 30 should not be so great that a significant tensile force is applied to the fiber or fibers 32. Where the tube 30 closely surrounds the fiber or fibers, the frictional force between the buffer material surrounding each fiber and the tube 30 will assist in drawing the fiber or fibers into the tube 30. Since no significant forward tensile force is being applied, the fiber or fibers are in a substantially no-load condition at the same time the strip 12 is undergoing its maximum plastic extension. Additionally, each fiber is still in a substantially no-load condition at the same time the tube is undergoing elastic tension. Upon release of the tensile force acting on the tube 30, the fiber or fibers 32 will be placed in static compression.

If needed, apparatus 100 may be provided with a sizing die not shown for providing cable core 11' with a particular outer dimension.

It is preferred that the protective sheaths 50, 80, and 102 be formed from a material having certain properties. First, the material should not be bondable to the metal or metal alloy forming tube 30. If the material were bondable, the sealing operation could bond the protective sheath to the tube 30. Second, the material should be able to withstand the temperatures associated with the sealing operation and, therefore, should have good high temperature properties. Finally, the material should have high strength characteristics and should have a relatively low thermal conductivity. By providing a material having a relatively low thermal conductivity, little or substantially none of the heat created during the sealing operation will be transmitted to the optical fiber or fibers and/or any filler material. Suitable materials out of which the protective sheath may be fabricated include refractory alloys such as high-nickel alloys, ceramic materials, high stainless steels, sapphire, insulating-type materials and composites comprising an outer material having a relatively low thermal conductivity and an inner material having a higher thermal conductivity than the outer material. It should be recognized that the aforementioned materials are exemplary and should not be limiting in any way. Other suitable materials may be used.

In certain high temperature situations, it may be desirable to provide the protective sheath with a cooling arrangement. In this way, each optical fiber and/or any filler material may be additionally protected from heat generated during fabrication. Cooling could be provided in any suitable conventional manner. For example, the protective sheath could be connected to an external cooling apparatus 112. Cooling apparatus 112 may comprise any suitable conventional cooling apparatus known in the art. Cooling could be provided to any or each passageway of the protective sheath. In situations where it is desirable to provide cooling, it would be advantageous to form the protective sheath out of a composite material as discussed above. The higher thermally conductive inner material could be connected to the cooling apparatus while the outer material performs its protective function.

The tube 30 may contain any desired number of optical fibers 32. In a preferred embodiment, one to six optical fibers are located within the cable core. Preferably, each optical fiber 32 comprises a photoconductor glass rod; however, any suitable optical fiber with or without a buffer material around the optical fiber may be used in the cable. Where the buffer material surrounding the optical fiber substantially occupies the internal tube area, the filler material 34 may be omitted.

In addition to or in lieu of one or more of the fibers, the tube 30 may contain one or more electrical conductors such as a copper conductor not shown. The electrical conductor or conductors may be inserted in any suitable fashion.

After the containment tube 30 with one or more optical fibers 32 and a filler material 34, if one is used, has been assembled, it may be surrounded by one or more additional layers. For example, a dielectric layer 65 may be fabricated about the tube 30. A typical cable construction will have such a dielectric layer if the tube 30 is to be used as an electrical conductor. Dielectric layer 65 may be fabricated in any suitable conventional manner using any suitable conventional apparatus. For example, dielectric layer 65 may be extruded about the cable core by any suitable extruding arrangement 66 in a conventional manner. The dielectric layer 65 preferably comprises a high density polyethylene, although any suitable material may be used. If tube 30 is not used as an electrical conductor, the dielectric layer 65 may be omitted.

As shown in FIG. 5, the cable may be provided with a loadbearing layer 67. If a dielectric layer 65 is provided, the loadbearing layer is preferably fabricated about it. The loadbearing layer 67 serves as the primary tensile element in the cable, although some fraction of the total load may be carried by the tube 30. This layer also acts as an abrasion-resistant layer which completely covers and protects the cable core. Any suitable material such as polyethylene, polyamides, polyimides, epoxies, and other similar plastic materials may be used for the layer 67. In a preferred embodiment, this layer comprises a contrahelix of plastic filaments sold under the tradename KEVLAR by DuPont contained in a matrix of thermosetting epoxy. The fabrication of this layer may be done in a known manner by any suitable fabrication device 68, i.e. fabricating an annulus utilizing a die arrangement.

The cable is generally provided with an outer covering 69. The outer covering 69 serves as a barrier to water intrusion and defocuses external cutting or abrading forces. The outer covering 69 may be formed from any suitable material such as an elastometric material. The outer covering 69 may be fabricated in any well known manner by any conventional apparatus known in the art. For example, outer covering 69 may be extruded in a conventional manner by a conventional extrusion apparatus 70. In a preferred embodiment, covering 69 comprises a layer of black polyurethane. FIG. 5 shows an embodiment of a finally assembled cable.

While the optical fiber communication cable has been shown as having a dielectric layer, a loadbearing layer and an outer covering, any number of protective layers including another metallic type layer may be fabricated about the tube 30.

Placing the fiber or fibers in static compression during the core fabrication process provides several advantages to the final cable construction. For example, if during use a tensile force is applied to the final cable construction, the metal or metal alloy containment tube is capable of undergoing a certain elongation before the tensile force is transmitted to the fiber or fibers. Since the fiber or fibers are in static compression, the fiber or fibers first come to zero strain when the tensile forces are transmitted to them. Similarly, when the metal or metal alloy containment tube undergoes expansion as a result of thermal stresses, the fiber or fibers are not immediately placed in danger. Typically, a fiber or fibers inserted in the manner of the instant invention will be on the compressive side of zero tension from about 0.02% to about 0.03% and will have a length greater than the length of the tube 30. The length of the fiber will be about less than 1% greater than the length of the tube 30.

An optical fiber cable generated by the aforementioned technique theoretically can have a substantially infinite length. This technique can be used to fabricate cable lengths of about 25 km. between repeaters. The cable can be used underground, aboveground, undersea or in any other environment. For example, it may be used to supply data support and power to a deep sea sensor. It may also be used for underground, aboveground, and undersea telephone applications.

The material comprising strip 12 and tube 30 should possess certain conductivity, strength, and diameter-to-thickness ratio characteristics. The material should possess a high electrical conductivity since tube 30 may act as a conductor in the final cable. In the cable system, tube 30 may be used to carry current between repeaters not shown.

Since tube 30 is preferably the only metal component in the cable, the material should possess high strength properties. The material preferably possesses significant yield strength and a relatively high yield strain. Tube 30 should be formed from a material that has a yield strength sufficient to keep the tube 30 in a substantially elastic state for any degree of cable bending. By having a containment tube that is maintained in a substantially elastic state and substantially never in a plastic state, the risk of breaking the glass fiber or fibers due to placing the glass fiber or fibers in tension may be further minimized.

A material having a relatively high yield strain is important since it reduces the overall cable diameter. The yield strain of the material forming the tubular member also determines how much of the ultimate strength of an outer loadbearing layer can be used without permanently straining the tubular member and breaking the optical fiber or fibers.

The material used to produce tube 30 should also be capable of sustaining certain coiling forces during fabrication and installation. Therefore, a diameter-to-thickness ratio which indicates good formability characteristics is required. If the material does not possess good formability characteristics, the tube wall may be crinkled or buckled during tube formation. If this occurs on the inner surface of the member, optical fiber or fibers 32 may suffer microbending against angular surfaces and large increases in attenuation may result. For optical fiber applications, the diameter-to-thickness ratio preferably is from about 5:1 to about 25:1 and most preferably is from about 10:1 to about 20:1.

A preferred strip material has a conductivity in the range of about 25 to 102% IACS, a yield strength in the range of about 30 to about 90 ksi, preferably in the range of about 50 ksi to about 60 ksi, and a yield strain, which is the strain at the yield strength at 0.2% offset, less than about 1%, preferably from about 0.3% to about 0.95%. A number of metals and alloys possess the required combination of strength, conductivity, and diameter-to-thickness ratio and may, therefore, be utilized. Where combinations of strength and conductivity are required, copper and its alloys and iron and its alloys, e.g. stainless steel, may be utilized. For certain applications where conductivity is not of significant importance, the yield strength of the tube should be at least about 100 ksi and preferably at least about 150 ksi.

Preferably, the strip material should have good resistance to softening upon short-term exposure to elevated temperatures so that it will not lose significant strength during the sealing operation. Suitable copper alloys in accordance with this invention having the requisite strength and softening resistance comprise alloys drawn from the following systems: copper-zirconium, copper-chromium, copper-iron, copper-silver, copper-magnesium-phosphorus, copper-nickel-silicon, etc. Generally, in such copper alloy systems copper is present in an amount of at least about 95% and represents the balance of the alloy. The alloying elements may be selected from the group consisting of zirconium, chromium, iron, magnesium, phosphorus, nickel, silicon, tin and silver as well as combinations thereof. For applications where a moderate strength level and a conductivity greater than about 50% IACS are needed, the alloying elements should preferably be present in an effective amount to provide the desired strength and softening resistance up to about 5% by weight of the alloy and most preferably in such an effective amount up to about 3% by weight of the alloy.

Suitable materials include CDA Alloys 151, 155, 194 and 195. In addition other high strength copper alloys such as CDA Alloys 638 and 654 can be used for very high strength applications. Alloy 638 includes aluminum, silicon and cobalt within the aforenoted range while Alloy 654 includes silicon, tin and chromium also within that range. In accordance with this invention, the metal tube should preferably be formed from a material having a minimum of 45 ksi tensile strength at 400° F. in order to be properly processable in accordance with this invention which involves heating the tubing during soldering while it is maintained under high tension.

The strip 12 from which the tube 30 is formed may have any suitable cross section configuration. If desired, one or more of the edge portions of the strip may be shaped.

Filler material 34 may comprise any suitable nonsetting void filler. The temperature to which the filler material is heated depends upon the selected filler and its viscosity characteristics. In a preferred embodiment, filler material 34 comprises a gel which is initially introduced into its passageway at a temperature in the range of about 35° C. to about 150° C., preferably at about 100° C. A suitable filler which may be used for filler material 34 is "PENRECO FW" made by Penreco of Butler, Penna.

The use of filler material 34 is desirable in a cable which may be subjected to high bending or hydrostatic stresses. Filler material 34 has two primary functions. First, it lubricates the fiber or fibers 32 to prevent stiction and microbending. Second, it provides the fiber or fibers 32 with a hydrostatic, ambient pressure environment.

While the tube forming apparatus has been shown as having a sealing station, the sealing station may be omitted where a joint between the edges is not required, i.e. where only hydrostatic pressure is involved, the edges may be shaped to effect a mechanical interlock, or an outer sealant covering is used.

The patents, publications and patent applications set forth in the specification are intended to be incorporated by reference herein.

It is apparent that there has been provided in accordance with this invention a process and apparatus for assembling an optical fiber communication cable which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A process for making an optical fiber communication cable, said process comprising:
    forming a metal containment tube having at least one optical fiber therein, said tube forming step comprising die forming a strip of metal into said tube and inserting each said fiber into said tube without applying any significant tension to said fiber; and
    the improvement wherein the process includes the step of:
    placing each said fiber into static compression during said tube forming,
    whereby a tensile force substantially equal to said static compression may be imposed on said tube without damaging said at least one fiber.

2. The process of claim 1 wherein said die forming step comprises:
    providing at least one forming die; and
    applying a tensile load to said metal strip for drawing said metal strip through said at least one die,
    whereby said strip undergoes its maximum plastic extension and said tube undergoes elastic tension while each said fiber is in a substantially no-load condition.

3. The process of claim 2 wherein said placing step comprises:
    releasing said tensile load while each said fiber is in said substantially no-load condition.

4. The process of claim 1 wherein said inserting step comprises:
forming a catenary in each said fiber so that substantially no back tension is applied to each said fiber; and
drawing each said fiber into said tube without applying any significant forward tension.

5. The process of claim 4 wherein said catenary forming step comprises:
passing each said fiber over a pair of guide rolls; and
forming said catenary between said guide rolls.

6. The process of claim 4 further comprising:
providing a protective sheath about said at least one fiber;
forming said tube about said sheath; and
said fiber drawing step comprising permitting movement of said tube to pull said at least one fiber out of said sheath.

7. The process of claim 4 further comprising:
applying a relatively small back tension to each said fiber by suspending a weight from each said fiber.

8. The process of claim 1 further comprising:
said tube forming step including forming said tube with a seam;
sealing said seam; and
said inserting step comprising inserting each said fiber into said tube after said sealing has been completed.

9. The process of claim 8 further comprising:
inserting a filler material into said tube after said seam sealing and before said at least one fiber.

10. The process of claim 8 wherein said sealing comprises:
soldering said seam.

11. An apparatus for making an optical fiber communication cable, said apparatus comprising:
means for forming a metal containment tube having at least one optical fiber therein;
said forming means comprising at least one die for forming a strip of metal into said tube and means for drawing said metal strip through said at least one die and for exerting a tensile load on said tube; and
the improvement wherein the apparatus includes:
said forming means having means for placing each said fiber into static compression so that a tensile force substantially equal to said static compression may be imposed on said tube without damaging said at least one fiber, said placing means including means for inserting each said fiber into said tube without applying any significant tension to each said fiber,
whereby said strip undergoes its maximum plastic extension and said tube undergoes elastic tension while each said fiber is in a substantially no-load condition so that upon relaxation of said tensile load each said fiber is placed into static compression.

12. The apparatus of claim 11 wherein said inserting means comprises:
means for forming a catenary in each said fiber so that substantially no back tension is applied to each said fiber.

13. The apparatus of claim 12 wherein said catenary forming means for each fiber comprises:
at least one pair of guide rolls over which said fiber passes, said catenary being formed between said rolls.

14. The apparatus of claim 12 further comprising:
a weight for each said fiber,
wherein each said weight applies a relatively small back tension to each said fiber.

15. The apparatus of claim 11 further comprising:
a protective sheath through which each said fiber passes, and
said at least one die forming said tube about said protective sheath,
whereby movement of said tube draws said at least one fiber from said sheath without applying any significant tension to each said fiber.

16. The apparatus of claim 15 further comprising:
said sheath having means for inserting a filler material into said tube, said filler material substantially surrounding said at least one fiber.

17. The apparatus of claim 11 further comprising:
said at least one die forming said tube with a seam; and
means for sealing said seam.

18. The apparatus of claim 17 wherein said seam sealing means comprises means for soldering said seam.

19. An optical fiber communication cable comprising:
a metal containment tube having an inner periphery;
said tube containig at least one optical fiber, said at least one optical fiber being spaced from said inner periphery; and
each said fiber being in static compression,
whereby said tube may undergo a tensile force substantially equal to said static compression without damaging said at least one fiber.

20. The optical fiber cable of claim 19 further comprising:
a filler material substantially surrounding said at least one optical fiber.

21. The optical fiber cable of claim 19 further comprising:
each said fiber being surrounded by a buffer material; and
said at least one fiber and said buffer material substantially occupying the internal area of said tube.

22. The optical fiber cable of claim 19 further comprising:
said tube being a drawn tube.

23. The optical fiber cable of claim 19 further comprising:
at least one external layer surrounding said tube.

24. The optical fiber cable of claim 19 further comprising:
said tube having a soldered seam for providing increased hermeticity.

* * * * *